United States Patent [19]

Grayson

[11] Patent Number: 5,645,105

[45] Date of Patent: Jul. 8, 1997

[54] TANK-FILLING SHUT-OFF VALVE

[75] Inventor: John R. Grayson, Inverness, Ill.

[73] Assignee: Aquion Partners Limited Partnership, Elk Grove Village, Ill.

[21] Appl. No.: 628,330

[22] Filed: Apr. 5, 1996

[51] Int. Cl.[6] ............................. F16K 31/20; F16K 33/00
[52] U.S. Cl. .................. 137/430; 137/438; 137/449; 137/901; 141/198
[58] Field of Search ..................... 137/429, 430, 137/433, 438, 449, 451, 901; 141/198

[56] References Cited

U.S. PATENT DOCUMENTS

| | | | |
|---|---|---|---|
| 486,398 | 11/1892 | Farrand | 137/433 |
| 571,168 | 11/1896 | Mott, Jr. | 137/449 |
| 736,516 | 8/1903 | Griffiths | 137/438 |
| 925,153 | 6/1909 | Barry | 137/449 |
| 1,062,537 | 5/1913 | Culbertson | 137/438 |
| 1,447,231 | 3/1923 | Barry | 137/449 |
| 2,241,636 | 5/1941 | Eliason | 137/451 |
| 2,550,313 | 4/1951 | Tucker | 137/449 |
| 3,110,036 | 11/1963 | Downin | 137/449 |
| 4,428,208 | 1/1984 | Krause | 137/440 |
| 4,887,633 | 12/1989 | Taylor, Jr. | 137/433 |

Primary Examiner—George L. Walton
Attorney, Agent, or Firm—Emrich & Dithmar

[57] ABSTRACT

A valve mechanism for supplying liquid to a container until the surface of the liquid reaches a predetermined level includes a valve body disposable in the container and defining a cavity, an inlet port for communication with a liquid source and an outlet port communicating with the interior of the container. A valve seat is provided in the cavity adjacent to the outlet port, and a valve member in the shape of a ball is disposed within the cavity and moveable between a normal closed condition and an open condition relative to the valve seat for respectively closing and opening the outlet port. A guide tube depends from the valve body in communication with the outlet port and has a float coupled to it. A valve actuator includes a base seated in the container and a rod extending upwardly therefrom into the guide tube. The actuator rod is engageable with the valve member for holding the valve member in its open condition when the surface of the liquid in the container is below the predetermined level. The actuator withdraws from the outlet port to also allow the valve member to move to its normal closed condition when the surface of the liquid in the container is at or above the predetermined level.

13 Claims, 1 Drawing Sheet

TANK-FILLING SHUT-OFF VALVE

BACKGROUND OF THE INVENTION

1. Field of the Invention

The present invention relates to shut-off valves for controlling the level of fluid in a container, and more particularly, to valves of the type including a float and a valve actuator which cooperate to operate the valve between open and closed conditions in response to a change in the fluid level.

2. Description of the Prior Art

Valve mechanisms of the type provided with a float device that rises with the liquid supply level flowing into a container are well known.

U.S. Pat. No. 1,219,567 to Leitch discloses a valve mechanism with a valve body positioned a fixed distance from a container therebelow. Liquid flows into a valve body chamber via an inlet port coupled to an external supply source and flows out of the chamber through an outlet port. The outlet port is sized to receive a tube which is carried by a float, and which tube moves concentrically through the outlet port, rising and falling relative to the supply level in the container. As the supply level rises, the upper extremity of the tube extending into the valve body cavity is moved toward contact engagement with a partly-conical valve member (button). Once a predetermined liquid level has been reached in the container, the upper extremity of the tube will contact the button sealing the further flow of liquid from the outlet port into the container.

U.S. Pat. No. 1,586,405 to Burge discloses a valve mechanism having a float coupled to a rod which together movably seat and unseat a ball-shaped valve member to close and open a passageway through a fixed position valve body (pipe). Through this passageway flows liquid from an external feed line into a container, the float being buoyantly disposed in the container to mechanically cause pivoting of the rod as the liquid level in the container changes.

U.S. Pat. No. 2,130,876 to Cordts discloses a valve mechanism including a float which rises concentrically up into an orifice defined by the outlet port of a valve body, the float rising as the liquid in a container approaches a predetermined level. A ball adapted to normally rest on the inner, upper end of the outlet port is also provided. The shape of a lower end of the outlet port is conical and adapted to cooperate with a closure valve on the upper side of the float. A tubular extension on the float initially is movable upwardly and engageable to unseat the ball, allowing liquid to flow into the container. As the float rises further in response to the rise in the liquid level, the closure valve and Conically-shaped lower end of the outlet port are brought into Contact, sealing the outlet and restricting further flow into the container.

It is well known in the prior art, therefore, to provide valve mechanisms of the type including a float which rises and falls with the liquid level to operate a valve member to control flow of liquids through a valve body. However, all such valve mechanisms are similar in that the floating activator moves with respect to a fixed or stationary valve body. Consequently, mounting apparatus must be provided for holding the valve body stationary relative to the container.

SUMMARY OF THE INVENTION

It is a general object of the present invention to provide a valve mechanism having a non-stationary valve body operable between the closed and normally open conditions for controlling the supply of liquids flowing into a container.

It is another object of the present invention to provide a valve mechanism having a non-stationary valve body of the type coupled to a float and moveable between the closed and open conditions relative to a fixed actuator.

It is yet another object of the present invention to provide a valve mechanism, as described generally above, which has few overall components, all of which are of generally simple and economical construction.

These and other features of the invention are attained by providing a valve mechanism for supplying liquid to a container until the surface of the liquid reaches a predetermined level. The valve mechanism includes a valve body, defining a cavity, disposable in the container. The valve body includes an inlet port for communication with a liquid source and an outlet port communicating with the interior of the container. The valve mechanism also includes a valve seat, provided in the cavity adjacent to the outlet port, and a valve member in the shape of a ball disposed within the cavity and moveable between a normal closed condition and an open condition relative to the valve seat for respectively closing and opening the outlet port. Further provided is a valve actuator mounted in the container and extending upwardly therefrom, and a float coupled to the valve body for floating the valve body in the liquid in the container with the outlet port aligned with the actuator. The actuator is engageable with the valve member for holding the valve member in its open condition when the surface of the liquid in the container is below the predetermined level. The actuator allows the valve member to move to its normal closed condition when the surface of the liquid in the container is at or above the predetermined level.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 2:
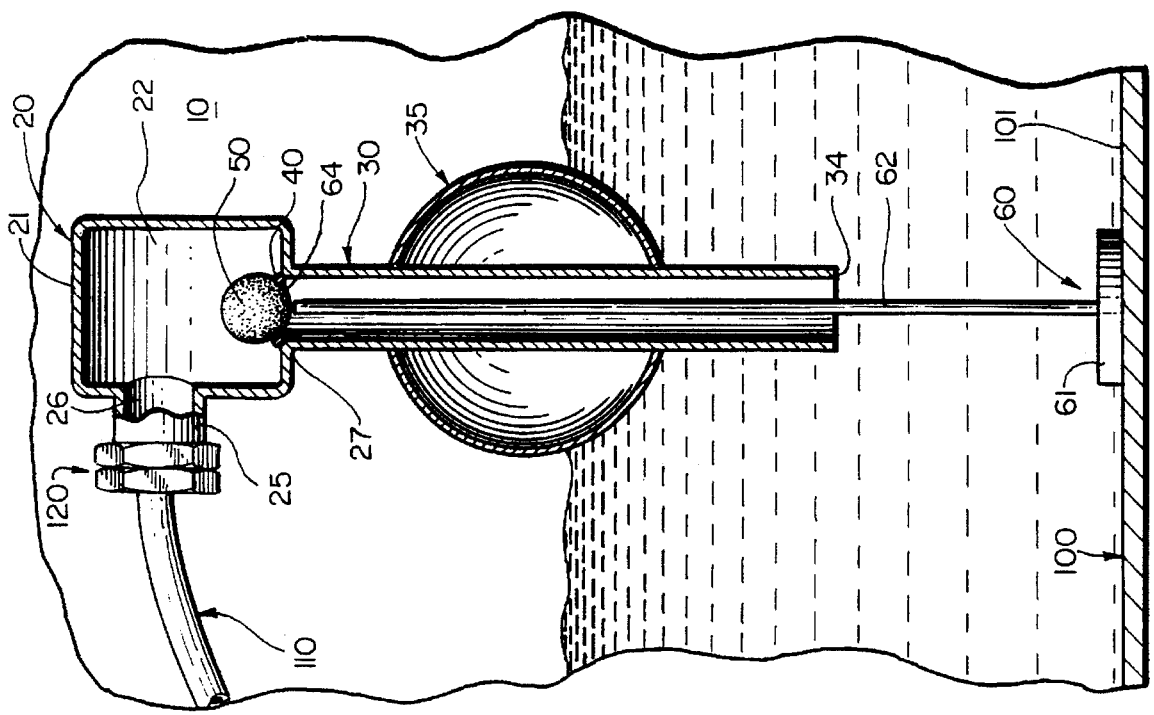
FIG. 2 is a view similar to FIG. 1, but showing the valve in its closed condition.
Figure 1:
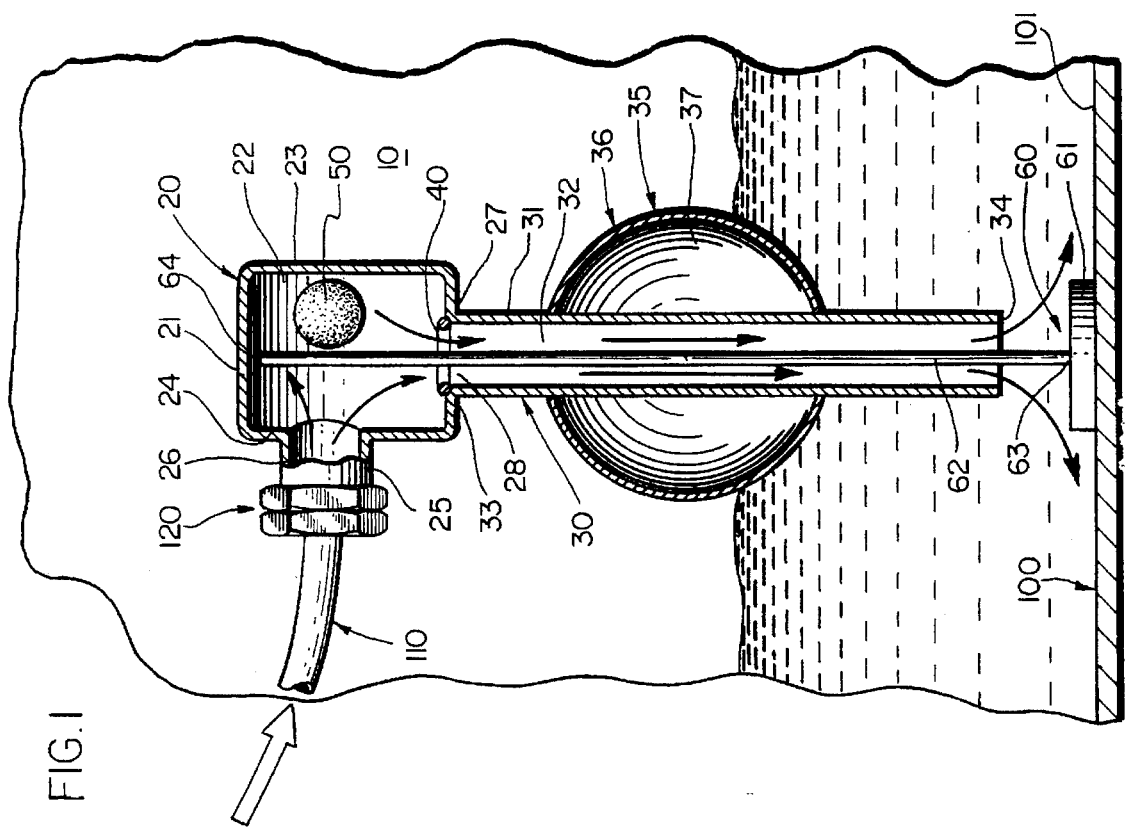
FIG. 1 is a vertical sectional view, partially in side elevation, of a valve mechanism, constructed in accordance with and embodying the features of the present invention, shown coupled to a liquid supplying source and disposed within a container, shown in fragmentary view, with the valve in its open condition.

Referring to FIGS. 1 and 2, there is illustrated a valve mechanism, generally designated by the numeral 10, constructed in accordance with and embodying the features of the present invention. Valve mechanism 10 is a shut-off valve for controlling the level of fluid flowing into a container 100 from, for example, a pressurized liquid supply source (not shown). FIG. 1 shows the valve mechanism in the open condition and FIG. 2 shows it in the closed condition. In the illustrative embodiment, a liquid, such as water, flows from the supply source to a flexible hose 110 connected, by way of a conventional coupler 120, to the valve mechanism 10.

The valve mechanism 10 is of six-part construction, and includes a valve body 20, a guide member 30 formed unitary with valve body 20, a float 35, a valve seat 40, a ball 50 and a valve actuator 60, the latter being of sufficient weight to be anchored stationary on a flat floor 105 of the container 100.

The valve body 20 includes a fixed-length, circularly cylindrical wall 21, closed at one end by a first flat circular wall 23 and at an opposite end by a second flat circular wall 24 to define a first cavity 22. An inlet port 25, defined by a sideways projecting wall, is formed on the second wall 24, which in turn defines a circular-cylindrical, inlet passageway 26 communicating at an open end thereof with the first cavity 22 and at the opposite end with an end of the flexible hose 110. Liquids from the hose 110 flow through the inlet passageway 26 of inlet port 25 and into the cavity 22 of valve body 20. The valve body 20 further includes an outlet port 27, defined by an opening 28 formed on valve body cylindrical wall 21.

In the preferred construction, guide member 30 is a generally tube-shaped member formed unitary with the valve body 20. The guide member 30 includes a depending cylindrical wall 31, the inner surface of which defines a second cylindrical cavity 32 of fixed diameter communicating at an upper open-end portion 33 thereof with outlet port opening 28. A lower open-end portion 34 of wall 31 functions as a receiving end for the valve actuator 60, as will be described below. The float 35 includes a generally spherical body 36 defining an inner float cavity 37, the float being fixed to the guide member 30 coaxially therewith between the ends thereof.

The valve seat 40, which in the illustrative embodiment is an O-ring made of rubber, plastic or the like material, is disposed adjacent to the outlet port 27 encircling the opening 28, as shown in FIGS. 1 and 2.

The ball 50 is permanently disposed in the valve body cavity 22, and may be formed of a material which varies in accordance with the density and pressure of the liquid flowing into the valve body 20 through the flexible hose 110 from the supply source (not shown), and is dimensioned for engagement against the valve seat 35 to seal the outlet port opening 28, under the conditions shown in FIG. 2 to be described in greater detail below.

The valve actuator 60 mounts to the container floor 105 and consists of a base portion 61, of generally solid annular construction, and an upwardly-projecting rod 62 coupled at a bottom portion 63 thereof to the center of base portion 61. The upper distal end of rod 62 defines a valve body engaging end 64. The rod 62 has a diameter less than the inner diameter of the guide member 30 and the diameter of the O-ring 40 and has a length substantially greater than the length of guide member 30. In the present illustrative embodiment, the base portion 61 of the valve actuator 60 is made flat along the bottom surface thereof for maximum contact with a container floor 105 which is likewise flat in shape.

During initial assembly, the valve mechanism 10—which includes the valve body 20 having disposed therein the valve seat 40 and the ball 50 as shown in the figures and described above—is coupled to the flexible hose 110 using a coupler 120 placed in the container 100. The ball 50—under its own weight—is normally seated against the valve seat 40 to close the path of liquid out of the outlet port 27 flowing into the valve cavity 22 from the flexible hose 110. As an initial step, the valve actuator 60 is lodged on the container floor 105. In the preferred embodiment, the valve actuator 60 is non-permanently anchored—under its own weight—fixedly against the floor 105. It is envisioned, however, that a more permanent connection may be preferred in environments where the container 100 itself may be subject to vibration particularly during fill-up.

The lower open-end portion 34 of guide member 30 is then slid longitudinally over the valve body engaging end 64 of rod 62, and moved downwardly along the length of the rod 62. As the guide member 30 slides over the rod 62, the rod 62 travels the whole longitudinal distance of the wall 31, at some point, unseating the ball 50 from the valve seat 40, with an upper portion of the rod 62 becoming disposed within the valve body cavity 22, in alignment with the guide member 30, and may or may not contact the inner surface of the valve body cylindrical wall 21.

The operation of the valve mechanism 10 as a shut-off valve during container fill-up will now be described first with reference to FIG. 1, which shows the valve mechanism 10 in the open (container-not-full) condition and then with reference to FIG. 2, which shows the valve mechanism 10 in the closed (container-full) condition.

First, a liquid supply from an external (pressurized or non-pressurized) source flows through the flexible hose 110, entering the valve body cavity 22 via the inlet port 25 connection. Initially, since the valve body engaging end 64 of rod 62 is disposed above the valve seat 40 (forcing ball 50 in the unseated position), liquid flowing into the valve body cavity 22 escapes through the opening 28 of outlet port 27, down the second cavity 32 of guide member 30, eventually flowing out the lower open-end 34 thereof and into the container 100. This condition is shown in FIG. 1.

As liquid enters the container 100, it ultimately reaches the level of the float 35, causing it to rise (and with it valve body 20) to a point where the valve seat 40 (O-ring) is above the top of the valve body engaging end 64 of the rod 62 (see FIG. 2). At this point, the liquid flowing into the cavity 22 and the ball's natural weight cause the ball 50 to become lodged against the valve seat 40 to prevent admission of further liquid into the container 100.

It should be appreciated that the level at which a container-full condition occurs is a function of the length of the valve actuator 60, the length of the guide member 30, the size of the float 35 and the circumference of the valve body wall 31.

Accordingly, it can be seen that a novel (shut-off) valve mechanism 10 has been provided which will maintain a predetermined level of fluid within a container. The mechanism 10 is compact and includes a valve actuator which can be placed in a variety of container shapes with little or no modification. The valve mechanism can be inexpensively manufactured due to the small number and simple configuration of its components.

From the foregoing, it can be seen that there has been provided a unique valve mechanism with a non-stationary valve body of the type including a float, which is economical, easy to manufacture, and easily engageable with an appropriately sized liquid supplying source at one end and with a container on another end.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A valve mechanism for supplying liquid to a container until the surface of the liquid reaches a predetermined level, comprising:

a valve body removably disposable in the container and defining a cavity and including an inlet port for communication with a liquid source and an outlet port communicating with the interior of the container;

a valve seat in Raid cavity adjacent to said outlet port;

a valve member in said cavity and moveable between a normal closed condition and an open condition relative to sand seat for respectively closing and opening said outlet port;

a valve actuator discrete from said valve member and freely separable therefrom and from said valve body and mounted in the container and extending upwardly therefrom; and a float carried by the valve body and free of the container for floating the valve body in the liquid in the container with said outlet port aligned with said actuator, said actuator being directly engageable with said valve member in response to movement of said valve body with the liquid level in the container for holding said valve member in its open condition when the surface of the liquid in the container is below the predetermined level, and said actuator being responsive to movement of said valve body with the liquid level in the container for allowing said valve member to move to its normal closed condition when the surface of the liquid in the container is at least at the predetermined level.

2. The valve mechanism of claim 1, wherein said valve seat is an O-ring.

3. The valve mechanism of claim 2, wherein said valve member is a ball, said ball being disposed for sealing engagement with said valve seat when said valve member is in the closed condition.

4. The valve mechanism of claim 1, wherein said valve member is a ball, said ball being disposed for sealing engagement with said valve seat when said valve member is in the closed condition.

5. The valve mechanism of claim 1, wherein said valve body includes a guide member defining a second cavity communicating with said outlet port, said actuator including a rod, at least a portion of said rod being disposed substantially within said second cavity and maintained by said guide member substantially in alignment with said outlet port.

6. The valve mechanism of claim 5, wherein said guide member is generally tube-shaped.

7. The valve mechanism of claim 6, wherein said valve seat is an O-ring.

8. The valve mechanism of claim 7, wherein said valve member is a ball, said ball being disposed for sealing engagement with said valve seat when said valve member is in the closed condition.

9. The valve mechanism of claim 5, wherein said actuator includes a base portion of sufficient weight to anchor said actuator stationary in the container.

10. The valve mechanism of claim 5, wherein said float is mounted on said guide member.

11. The valve mechanism of claim 1, wherein said actuator includes a base portion and an upstanding rod, said base portion being of sufficient weight to anchor said actuator stationary in the container.

12. The valve mechanism of claim 1, wherein said valve body is coupled to a flexible tube at said inlet port.

13. A valve mechanism for supplying liquid to a container until the surface of the liquid reaches a predetermined level, comprising:

a valve body removably disposable in the container and defining a cavity and including an inlet port for communication with a liquid source and an outlet port communicating with the interior of the container;

a valve seat in said cavity adjacent to said outlet port;

a valve member in said cavity and moveable between a normal closed condition and an open condition relative to said seat for respectively closing and opening said outlet port;

a valve actuator disposed in the container discrete from said valve member and freely separable therefrom and from said valve body;

structure retaining a stationary one of the valve body and the actuator in a predetermined position in the container; and a float carried by a movable one of the valve body and the actuator other than the stationary one and free of the container for floating the movable one in the liquid in the container with said outlet port aligned with said actuator, said actuator being directly engageable with said valve member in response to movement of the movable one of the valve body and the actuator with the liquid level in the container for holding said valve member in its open condition when the surface of the liquid in the container is below the predetermined level, and said actuator being responsive to movement of the movable one of the valve body and the actuator with the liquid level in the container for allowing said valve member to move to its normal closed condition when the surface of the liquid in the container is at least at the predetermined level.

* * * * *

UNITED STATES PATENT AND TRADEMARK OFFICE
CERTIFICATE OF CORRECTION

PATENT NO. : 5,645,105

DATED : July 8, 1997

INVENTOR(S) : John R. Grayson

It is certified that error appears in the above-identified patent and that said Letters Patent is hereby corrected as shown below: Title page, item

[56] References Cited - U.S. Patent Documents, the following U.S. patent should be added:

```
--    185,134     12/1876    Rogers
      201,758      3/1878    Downey
      274,186      3/1883    Getchell
      540,585      6/1895    Doerhoefer
      606,906      7/1898    Zertuche
    1,102,870      7/1914    Carreyn
    1,147,702      7/1915    Bower
    1,219,567      3/1917    Leitch
    1,586,405      5/1926    Burge
    2,130,876      9/1938    Cordts
    2,300,856     11/1942    Anderson
    3,227,173      1/1966    Bernstein
    3,465,784      9/1969    Cofoid
    3,863,663      2/1975    Bornhorst
    3,973,582      8/1976    Siebold
    4,431,024      2/1984    Gallagher
    5,090,443      2/1992    Jacobson
    5,284,191      2/1994    McGarvey--.
```

UNITED STATES PATENT AND TRADEMARK OFFICE
CERTIFICATE OF CORRECTION

PATENT NO. : 5,645,105
DATED : July 8, 1997
INVENTOR(S) : John R. Grayson

It is certified that error appears in the above-indentified patent and that said Letters Patent is hereby corrected as shown below:

[57] Abstract, line 5, "cutlet" should be --outlet--;

Column 5, line 19, "Raid" should be --said--; and line 22, "sand" should be --said--.

Signed and Sealed this

Eighteenth Day of November 1997

BRUCE LEHMAN

*Attest:*

*Attesting Officer*

*Commissioner of Patents and Trademarks*